…

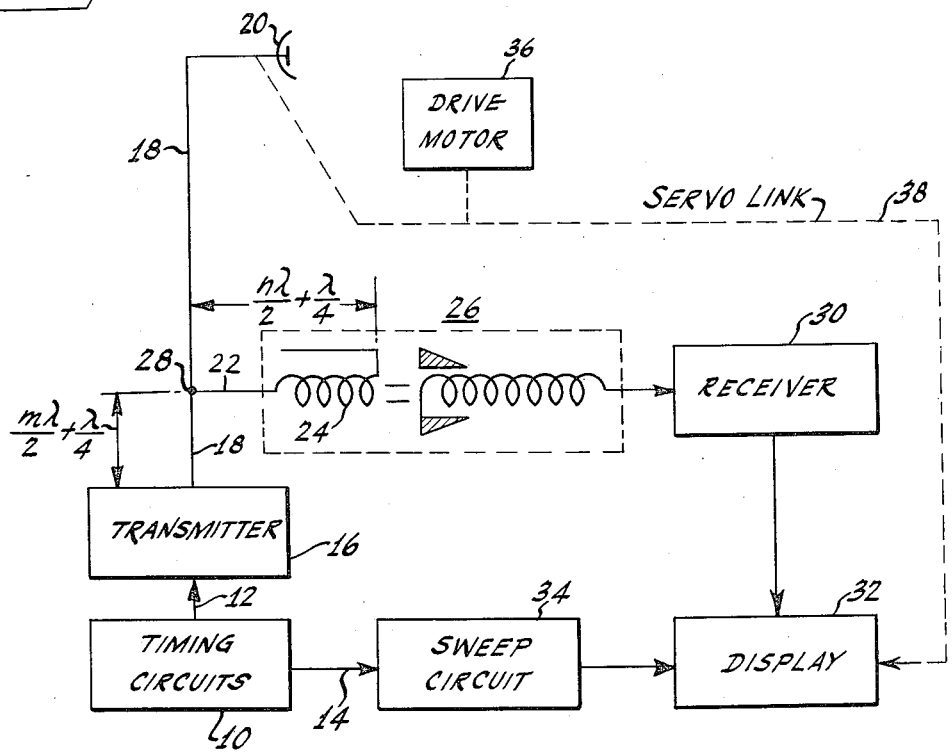
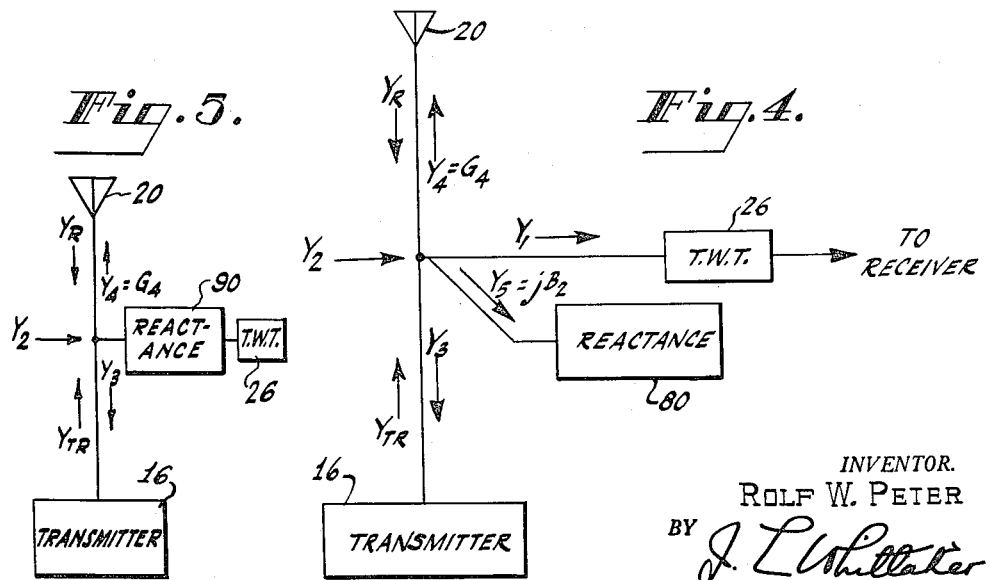

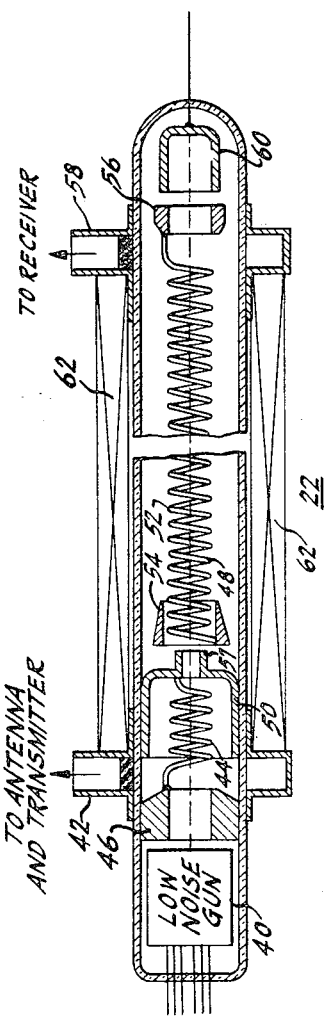
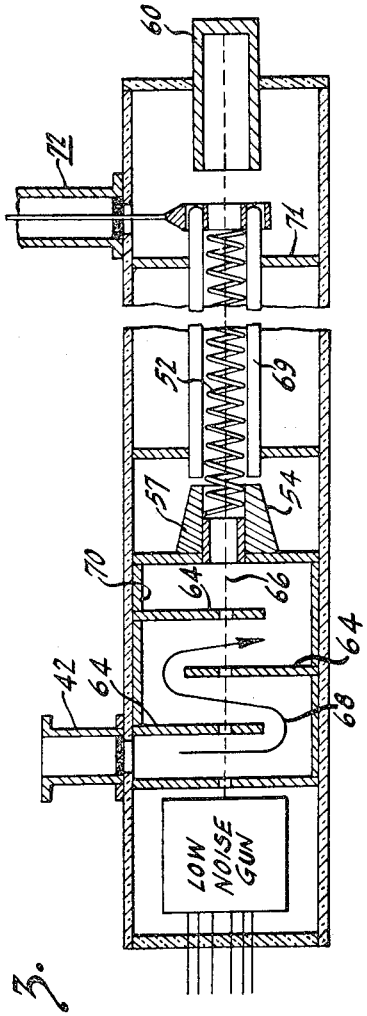
Fig. 2.
Fig. 3.
INVENTOR.
ROLF W. PETER
BY
ATTORNEY

United States Patent Office 3,068,414
Patented Dec. 11, 1962

3,068,414
RADAR WITH TRAVELING-WAVE TUBE DUPLEXER
Rolf W. Peter, Princeton Junction, N.J., assignor to Radio Corporation of America, a corporation of Delaware
Filed June 12, 1958, Ser. No. 741,484
6 Claims. (Cl. 325—23)

The present invention relates, in general, to radar and, more particularly, to improved duplexing circuits for radar systems.

Conventional pulsed radar systems employ a single antenna both for reception and transmission. The connection between the antenna, transmitter, and receiver normally includes a gas-filled tube known as a TR (transmit-receive) tube or switch. During transmission, the tube fires (conducts) and the transmitter energy is prevented, or substantially prevented, from reaching the receiver. During reception, the gas in the tube deionizes and the received echoes pass to the receiver. Transmission line lengths are such that little power passes to the transmitter during reception.

Unfortunately, TR tubes are not perfect switches. During transmission, a portion of the transmitted power, known as leakage power, passes through the TR tube to the receiver and may damage the latter's delicate input stage (usually a crystal). The arc formed when the TR tube fires deteriorates the TR tube and causes the tube eventually to fail. Finally, the TR tube suffers from slow deionization and this prevents the detection of echoes at short ranges.

An object of the present invention is to provide an improved form of duplexer which has none of the disadvantages outlined above.

Another object of the invention is to provide a simplified radar system which does not require a conventional TR tube.

Yet another object of the invention is to provide an improved radar system which is useful at short ranges and which can employ short pulses.

Still another object of the invention is to provide an improved type of traveling-wave tube which is especially useful for duplexing functions.

According to the present invention, a traveling-wave tube acts as the duplexer for a radar system. The traveling-wave tube, which is itself new, includes an input section which looks to a low power signal like a matched termination and to a high power signal like a reactive load—preferably an open circuit. The input section includes a slow-wave structure, which is mis-matched at its far end, through which the electron beam passes. The tube parameters including the interaction factor, the beam current, the slow-wave structure length, and the like are so chosen that a low-power input signal at the radio-frequency is matched to the electron beam over a reasonably large frequency band. However, when the input signal is at a high level, such as the case when a transmitted pulse is applied to the input section, the slow-wave structure looks to the input signal like a reactive load and substantially no transmitter power is lost to the tube.

In a preferred form of the invention, a second reactance is placed in circuit with the line leading to the input section of the traveling-wave tube and a portion of the transmitted power is reflected by it. Thus, the full amount of transmitted power need not be reflected by the input section of the traveling-wave tube and it can be of lower power handling capability than would otherwise be necessary.

The traveling-wave tube also includes a second slow-wave structure coupled by the electron beam to the first slow-wave structure for amplifying a received signal. The output of the traveling-wave tube may be applied directly to the radar receiver. A separate TR tube is not needed.

The invention will be described in greater detail by reference to the following description taken in connection with the accompanying drawing in which:

FIG. 1 is a block circuit diagram of an embodiment of a radar system according to the present invention;

FIG. 2 is a section through one form of a traveling-wave tube which may be used in the circuit of FIG. 1;

FIG. 3 is a section through another type of traveling-wave tube which may be used in the circuit of FIG. 1; and FIGS. 4 and 5 are block circuit diagrams of systems according to the invention showing the admittances at different branches of the circuit.

Throughout the figures similar reference numerals are applied to similar elements.

The timing circuits 10 shown in FIG. 1 produce synchronizing pulses at leads 12 and 14. Transmitter 16 is conventional and may include a high power modulator triggered by the pulses at lead 12 and a magnetron, klystron, traveling-wave tube or the like driven by the modulator. The pulse-modulated radio-frequency signal output of transmitter 16 is applied via lead 18 to the rotatable antenna 20. Lead 18 is a schematic representation for a waveguide, coaxial line or the like. A portion of the energy on line 18 attempts to travel down lead 22 and into the input section 24 of traveling-wave tube 26. However, for reasons which will be explained in greater detail later, this is prevented since looking from junction 28 toward the traveling-wave tube, the latter appears to a high-power signal like an open circuit.

Echoes received by antenna 20 pass down transmission line 18 to junction 28. The line length between junction 28 and transmitter 16 is such that the transmitter looks to the echoes like an open circuit and no, or substantially no, received power is lost. However, a low power signal looking from junction 28 toward the traveling-wave tube 26 sees a matched load and the signal is therefore substantially completely passed to the traveling-wave tube.

The traveling-wave tube amplifies the received echo and applies it to receiver 30. The receiver further amplifies the signal, detects the video components thereof, and applies the latter to display 32. The display may comprise a PPI indicator, in which case the video pulses are applied to intensity modulate the electron beam thereof.

The sweep voltage is generated in stage 34 and applied to the deflection means of the indicator. The deflection means may include a rotatable deflection coil which is driven synchronously with the rotation of antenna 20. The means for doing this is indicated schematically as including the antenna drive motor 36 and servo link 38 between the drive motor or antenna and the deflection coil.

The operation of the circuit of FIG. 1 may be better understood by referring to FIG. 2 which illustrates one form of traveling-wave tube which may be used in the circuit. This traveling-wave tube includes a low-noise gun shown schematically at 40, an input waveguide 42 leading to the antenna and transmitter, and an input slow-wave structure shown in the drawing as a helix 44. The helix is terminated at its input end in a metallic cylinder 46 through which the electron beam 48 passes and at its output end in a metallic shield 50. The shield is folded back over the helix and effectively serves as the outer conductor of a coaxial transmission line, the inner conductor of which is the helix. Since one end of the helix is connected directly to the shield, the coaxial line is effectively short-circuited at this end. Beyond the shield 50 and spaced therefrom is a second helix 52. This helix is terminated at its input end in a matched termination 54 and at its output end in a metallic cylinder 56. Isolation between the two helices is provided by the shield 57 (effectively a waveguide dimensioned to be below cut off at the input radio-frequency). The output waveguide structure is shown at 58 and the collector is shown as 60. The beam-focusing means is exemplified by a magnet coil 62. Other means of beam-focusing may be used, like periodic magnetic or electrostatic focusing.

The tube parameters are such that an input signal of low amplitude is matched to the electron beam. In this specific form of tube the maximum amount of power which can be transferred by the beam may be on the order of 0.1 watt. Accordingly, an input signal of low amplitude is amplified by the first and second slow-wave structures 44 and 52 and is applied via output waveguide 58 to the receiver.

In the case of an input signal of large amplitude (which may be on the order of tens or hundreds of kilowatts in the case of a radar signal), the input section of the traveling-wave tube looks like a high impedance. The input section is a transmission line which is short circuited at its far end. Its length plus that of the transmission line 22 (FIG. 1) is $$\frac{n\lambda}{2}+\frac{\lambda}{4}$$

where $n$ is an integer, so that looking from junction 28 (FIG. 1) toward the traveling-wave tube a high-power signal sees an open circuit. Since there is very little transmitted power lost to the traveling-wave tube and furthermore, since the traveling-wave tube itself does not produce at its saturation level an output signal having an amplitude sufficiently large to damage the delicate input stage to the receiver, the TR tube may be completely eliminated. Instead, the output waveguide 58 may be connected directly to the receiver.

While the arrangement shown in FIG. 2 is suitable for use with radar transmitters of low to moderate amounts of power, it is desirable in the case of higher amounts of input power to employ an input section to the traveling-wave tube having higher power handling ability. One of a large number of suitable tube structures is shown in FIG. 3. Here, the input section to the traveling-wave tube comprises a folded waveguide rather than a helix. The folded waveguide essentially consists of interleaving, metallic plates 64, each formed with an aperture through which the electron beam 66 passes. The waveguide is short-circuited at its far end by plate 70. The path followed by the slow-wave is indicated by arrow 68. As in the embodiment of FIG. 2, the path length along arrow 68 plus the length of transmission line 22 (see FIG. 1) are equal to $$\frac{n\lambda}{2}+\frac{\lambda}{4}$$

where $n$ is an integer, and $\lambda$ is the wavelength of the radar signal. Accordingly, a high-power signal at junction 28 looking toward the input section to the traveling-wave tube sees an open circuit.

The remainder of the traveling-wave tube is similar to the one shown in FIG. 2 and similar reference numerals are applied to similar parts. The focusing magnet is not shown. The helix is shown supported by ceramic rods 69 and the latter in turn are supported by ceramic disks 71. The output means is a coaxial line 72 to which the end of the second helix is capacitively connected. Other output means are possible.

In the embodiments of the invention illustrated, the second slow-wave structure, in both cases, is shown as a forward-wave amplifier. It is to be understood that in each case it can be a backward-wave amplifier instead. The choice will depend upon whether the broad-band characteristics of the forward-wave amplifier or the voltage tunable characteristics of the backward-wave amplifier are desired.

In the traveling-wave tubes illustrated above, the input slow-wave structure is short-circuited. However, the invention is not limited to this specific structure. All that is necessary is that the end of the slow-wave structure be terminated in an impedance which is widely different from its characteristic impedance. For example, the input slow-wave structure may be open circuited provided that the distance from the T junction (FIG. 1) to the end of the slow-wave structure is equal to $$\frac{n\lambda}{2}$$

where $n$ is an integer.

In the forms of the invention described above, during transmission the full amount of transmitted power is reflected from the input section of the traveling-wave tube. Since the peak transmitted power may be high the input section of the traveling-wave tube should preferably be of high-power handling capability. However, with slight circuit modification, the full amount of transmitted power need not be reflected from the slow-wave structure itself. A portion of the power can be reflected from a reactance 80 which may be placed, for example, in shunt with the receiving arm. An arrangement of this type is illustrated schematically in FIG. 4. Instead of a single reactance 80, two or more reactances may be placed between the T junction and the traveling-wave tube. Alternately, one (or several) pieces of line of different line impedance and appropriate length may be substituted and series connected into the traveling-wave tube input line. These modifications are discussed in a general way later in connection with FIG. 5.

The basic properties of the present invention are satisfied if the antenna is matched to the receiving arm (traveling-wave tube plus receiver) during reception (low input signal power level) and the transmitter is matched to the antenna during transmission (high input signal power level). The above conditions may most easily be expressed in terms of admittances. During reception the admittance $Y_R$ seen by the antenna must equal the admittance $Y_1$ of the receiving arm. During transmission, the admittance $Y_{TR}$ seen by the transmitter must equal the admittance $Y_4$ of the antenna which, in turn, should be a conductance $G_4$.

In the embodiment of the invention shown in FIG. 4, a reactance 80 is placed at or close to the T junction effectively in parallel with the receiver arm. The reactance may be a lumped reactance such as a capacitance or a distributed reactance such as a piece of transmission line with movable plunger or shorting bar. Looking from the T junction toward the receiving arm, one sees the admittance $Y_2 = Y_1 + Y_5$, where $Y_5 = jB_2$, and $Y_1$ equals a pure conductance $G_1$ during reception (the signal is matched to the beam), and a pure susceptance $jB_1$ during transmission (the high-power signal sees a reactive termination).

From FIG. 4 the following can be seen:

$$Y_R = Y_2 + Y_3 \tag{1}$$

Substituting $Y_1 + jB_2$ for $Y_2$ gives $$Y_R = jB_2 + Y_1 + Y_3 \tag{2}$$

However, at low signal levels $Y_1 = G_1$ 	(3)

Therefore, $$Y_R = jB_2 + G_1 + Y_3 \tag{4}$$

At low signal levels the admittance $Y_R$ seen by the antenna must equal $G_1$. Substituting this in the equation above gives $$Y_3 = -jB_2 \tag{5}$$

It can also be seen from FIG. 4 that $$Y_{TR} = Y_2 + Y_4 \tag{6}$$

At high signal levels $Y_1 = jB_1$, so that $$Y_2 = jB_1 + jB_2 \tag{7}$$

Therefore,
$$Y_{TR} = jB_1 + jB_2 + G_4 \quad (8)$$

During transmission, the admittance $Y_{TR}$ seen by the transmitter should equal a conductance and this conductance should be equal to the antenna conductance $G_4$. Substituting $G_4$ for $Y_{TR}$ in Equation 8 gives $$jB_1 = -jB_2 \quad (9)$$

From 9 to 5 we have $$Y_3 = jB_1 = -jB_2 \quad (10)$$

In the forms of the invention discussed previously there was no reactance placed in parallel across the receiving arm. Accordingly, this may be treated as the special case in which $$Y_5 = jB_2 = 0 \quad (11)$$

In this special case, the admittance $Y_2$ is 0 during transmission under the following conditions:

(a) The input section to the traveling-wave tube is short-circuited and the electrical length from the T junction to the end of the input section is $$\frac{\lambda}{4} + \frac{n\lambda}{2}$$

(b) The input section to the traveling-wave tube is open-circuited and the electrical length from the T junction to the end of the section is $$\frac{n\lambda}{2}$$

(c) The input section of the traveling-wave tube is reactively terminated and its length is intermediate $a$ and $b$ above and is such that the input signal sees an open circuit looking from the junction toward the traveling-wave tube.

In the more general case, the reactance $jB_2$ is finite, say capacitive (positive susceptance), and relatively small. In this case, we see from Equation 10

$$(-jB_1 = -Y_3 = +jB_2)$$

that since $jB_2$ is positive, the line between the junction and the transmitter must have a length such that it is slightly inductive ($Y_3$ is negative); the same holds for the line between the junction and the end of the input section to the traveling-wave tube ($jB_1$ is negative when $jB_2$ is positive). If $jB_2$ is positive (capacitive), and the input section to the traveling-wave tube is:

(a) Short-circuited at its end, then the line between the junction and the end of the input section of the traveling-wave tube is slightly less than $$\frac{\lambda}{4} + \frac{n\lambda}{2}$$

(b) Open-circuited at its end, then the line between the junction and the end of the input section to the traveling-wave tube is somewhat longer than $$\frac{n\lambda}{2}$$

The susceptance $jB_2$ may be inductive (negative) rather than capacitive. In this case, the line lengths under $a$ and $b$ above are slightly more than $$\frac{\lambda}{4} + \frac{n\lambda}{2}$$

(capacitive) and slightly less than $$\frac{n\lambda}{2}$$

(capacitive), respectively. The larger $jB_2$, whether positive or negative, the less power will be reflected from the input section of the traveling-wave; the lower therefore, the open end voltage (in the case of an open-circuited traveling-wave tube input section) or the short-circuited current (in the case of a short-circuited traveling-wave tube input section) at this point.

A more general aspect of the invention is shown in FIG. 5. Here the circuit which reflects a portion of the transmitted power is illustrated as a block 90. This block represents one or more reactive elements which may be in series, in parallel, or in series and parallel with the arm leading to the traveling-wave tube. It may represent lumped or series elements, or both, or there may be one or several such elements. The reactance 90 may be inductive or capacitive or may include inductive and capacitive components. The only conditions which must be satisfied in all of these cases are:

(a) During reception:

$$Y_R = Y_2 + Y_3 \quad (1)$$

where $Y_2 = jB_R + G_R$ (12) (for low signal level)

$G_R$ being the conductance of the matched input to the traveling-wave tube at low signal levels, and $jB_R$ being the susceptance contributed by the reactance of block 90, and $Y_3 = -jB_R$ so that
$$Y_R = G_R \quad (14)$$

(b) During transmission:

$$Y_{TR} = Y_4 + Y_2 \quad (6)$$

where $Y_4 = G_4$ (given)

$Y_2 = jB_R - jB_{TR}$ (15) (for high signal level)

$jB_{TR}$ being the susceptance contributed by the traveling-wave tube at high signal levels and
$$jB_R = jB_{TR} \quad (16)$$

whereby
$$Y_2 = 0 \quad (17)$$

so that $Y_{TR} = G_4$.

What is claimed is:

1. In combination, a transmission line structure having three branches leading from a common junction; a signal receiving channel connected to the first of said branches which is matched to said first branch at a relatively low input signal level and mis-matched thereto at a relatively high input signal level, whereby looking from said junction toward said signal receiving channel one sees a conductance $G_1$ at low signal level and a susceptance $jB_1$ at high signal level; a reactance connected in shunt with said first branch and having an admittance $jB_2$ looking from the junction into said reactance; antenna means connected to the second of said branches; and transmitter means connected to the third of said branches and having an admittance $Y_3$ looking from said junction toward said transmitter means, where $Y_3 = jB_1 = -jB_2$.

2. In combination, a transmission line structure having three branches leading from a common junction; a traveling-wave tube having an input slow-wave structure connected to the first of said branches which is matched to said first branch at a relatively low input signal level and mis-matched thereto at a relatively high signal level, whereby looking from said junction toward said traveling-wave tube one sees a conductance $G_1$ at low signal level and a susceptance $jB_1$ at high signal level; a reactance connected in shunt with said first branch which, looking from the junction into said reactance, has an admittance $jB_2$; antenna means connected to the second of said branches which, looking from said junction toward said antenna means, has an admittance $G_4$; and transmitter means connected to the third of said branches which, looking from said junction toward said transmitter, has an admittance $Y_3$, where $Y_3 = jB_1 = -jB_2$.

3. In the combination as set forth in claim 2, said admittance $jB_2$ being equal to 0.

4. In the combination as set forth in claim 2, said reactance being one of the type which, looking from the junction into said reactance, appears inductive.

5. In the combination as set forth in claim 2, said reactance being one of the type which, looking from the junction into said reactance, appears capacitive.

6. In the combination as set forth in claim 2, said input slow-wave structure being terminated at its far end in an impedance which differs widely from its characteristic impedance.

References Cited in the file of this patent
UNITED STATES PATENTS

| | | |
|---|---|---|
| 2,367,295 | Llewellyn | Jan. 16, 1945 |
| 2,603,743 | Lawson | July 15, 1952 |
| 2,753,481 | Ettenberg | July 3, 1956 |

OTHER REFERENCES

Microwave Theory and Techniques by Reich et al., Van Nostrand Co. Inc., 1953, pp. 834–835 relied on.

RCA Magnetrons and Traveling Wave Tubes, RCA Tube Div., copyright 1956, pp. 25, 26 relied on.